US011550831B1

(12) United States Patent
Marks et al.

(10) Patent No.: US 11,550,831 B1
(45) Date of Patent: Jan. 10, 2023

(54) SYSTEMS AND METHODS FOR GENERATION AND DEPLOYMENT OF A HUMAN-PERSONIFIED VIRTUAL AGENT USING PRE-TRAINED MACHINE LEARNING-BASED LANGUAGE MODELS AND A VIDEO RESPONSE CORPUS

(71) Applicant: TrueSelph, Inc., Ann Arbor, MI (US)

(72) Inventors: Eldon Marks, Georgetown (GY); Jason Mars, Ann Arbor, MI (US)

(73) Assignee: TrueSelph, Inc., Ann Arbor, MI (US)

( * ) Notice: Subject to any disclaimer, the term of this patent is extended or adjusted under 35 U.S.C. 154(b) by 0 days.

(21) Appl. No.: 17/849,589

(22) Filed: Jun. 24, 2022

Related U.S. Application Data

(60) Provisional application No. 63/222,169, filed on Jul. 15, 2021.

(51) Int. Cl.
| | | |
|---|---|---|
| G06F 16/332 | (2019.01) | |
| H04L 51/02 | (2022.01) | |
| G06K 9/62 | (2022.01) | |
| G06N 20/00 | (2019.01) | |

(52) U.S. Cl.
CPC ....... *G06F 16/3329* (2019.01); *G06K 9/6252* (2013.01); *G06N 20/00* (2019.01); *H04L 51/02* (2013.01)

(58) Field of Classification Search
CPC .............. G06F 16/3329; G06K 9/6252; G06N 20/00; H04L 51/02
See application file for complete search history.

(56) References Cited

U.S. PATENT DOCUMENTS

| | | | | |
|---|---|---|---|---|
| 10,832,062 | B1* | 11/2020 | Evans | ..................... G06V 20/56 |
| 11,368,776 | B1* | 6/2022 | Woodruff | ............... H03G 7/001 |
| 2016/0019202 | A1* | 1/2016 | Adams | ............... H04N 21/8547 |
| | | | | 704/9 |
| 2018/0211552 | A1* | 7/2018 | Samuelson | ......... G06F 16/7844 |
| 2019/0244609 | A1* | 8/2019 | Olabiyi | .................... G10L 15/26 |
| 2020/0105249 | A1* | 4/2020 | Bender | ............... G06F 16/9535 |
| 2021/0136195 | A1* | 5/2021 | Adi | ...................... G10L 15/1822 |
| 2021/0233031 | A1* | 7/2021 | Preuss | ...................... G09B 7/02 |
| 2021/0240775 | A1* | 8/2021 | Liu | ..................... G06F 16/9035 |

* cited by examiner

*Primary Examiner* — Akwasi M Sarpong
(74) *Attorney, Agent, or Firm* — Padowithz Alce; Alce PLLC (57) ABSTRACT

A system and method for implementing a machine learning-based virtual dialogue agent includes computing an input embedding based on receiving a user input; computing, via a pre-trained machine learning language model, an embedding response inference based on the input embedding; searching, based on the embedding response inference, a response imprintation embedding space that includes a plurality of distinct embedding representations of potential text-based responses to the user input, wherein each of the plurality of distinct embedding representations is tethered to a distinct human-imprinted media response, and searching the response imprintation embedding space includes: searching the response imprintation embedding space based on an embedding search query, and returning a target embedding representation from the response imprintation embedding space based on the searching of the response imprintation embedding space; and executing, via a user interface of the machine learning-based virtual dialogue agent, a human-imprinted media response tethered to the target embedding representation.

17 Claims, 7 Drawing Sheets

FIGURE 1

CREATING A VIDEO RESPONSE CORPUS | MEDIA CORPUS 210

VIDEO RESPONSE CORPUS PROCESSING 220

PARTITIONING A MEDIA FILE 222

VIDEO RESPONSE IDENTIFIERS | SELPH ID | IMPRINT ID 224

TRANSCRIBING A MEDIA FILE 226

COMPUTING EMBEDDING VALUES | VIDEO RESPONSE CORPUS VECTORS 230

N-DIMENSIONAL RESPONSE EMBEDDING SPACE 235

FIGURE 2

RECEIVING A USER UTTERANCE / USER STIMULUS 310

GENERATING RESPONSE INFERENCES USING ONE OR MORE PRE-TRAINED LANGUAGE PROCESSING MODELS 320

COMPUTING A VIDEO RESPONSE TO USER STIMULUS OR USER UTTERANCE UTILIZING ONE OR MORE PRE-TRAINED LANGUAGE PROCESSING MODELS 330

IDENTIFYING A VIDEO RESPONSE IMPRINT & GENERATING A RESPONSE USING THE SELECTING A VIDEO RESPONSE IMPRINT 340

IMPLEMENTING A HUMAN-PERSONIFIED VIRTUAL AGENT 350

SYSTEMS AND METHODS FOR GENERATION AND DEPLOYMENT OF A HUMAN-PERSONIFIED VIRTUAL AGENT USING PRE-TRAINED MACHINE LEARNING-BASED LANGUAGE MODELS AND A VIDEO RESPONSE CORPUS

CROSS-REFERENCE TO RELATED APPLICATIONS

This application claims the benefit of U.S. Provisional Application No. 63/222,169, filed on 15 Jul. 2021, which is incorporated in its entireties by this reference.

TECHNICAL FIELD

The inventions herein relate generally to the virtual assistant field, and more specifically to a new and useful system and method for generating and deploying human-personified artificially intelligent virtual agents using machine learning.

BACKGROUND

Modern virtual assistants may typically be employed to perform various tasks or services based on an interaction with a user. Typically, a user interacting with a virtual assistant may pose a question, a message, or otherwise submit an input to the virtual assistant, to which, the virtual assistant may provide a response or perform some action as a result of the user input. Many of these virtual assistants may typically be portrayed as a user interface object, such as a chat window or may include an animated computer object that lack real human features and real human mannerisms. As a result, a significant class of users fail to fully engage with the virtual assistant and may continue to prefer interactions that involve a real human agent.

Therefore, an inability of chatbot or virtual assistant systems in their ability to relate to human users may continue to act as a barrier for mass adoption of often helpful automated chat systems, automated engagement (human agent) (compromise, not relatable, human sounding; interactive human chatbot However, a virtual assistant or automated interaction system personified with real human response may create a more personable and engaging conversation which may increase the likelihood of a user's satisfaction with its response and interactions and therefore, reducing interaction loads on often limited real human agents.

Therefore, there is a need in the virtual assistant field to generate human-personified virtual assistants that deliver interactive automated human engagement with relatable personal features (e.g., a human, voice, human voice, human mannerisms, etc.). The embodiments of the present application described herein provide technical solutions that address, at least, the needs described above, as well as the deficiencies of the state of the art.

BRIEF SUMMARY OF THE INVENTION(S)

In some embodiments, a method of implementing a human video-personified machine learning-based virtual dialogue agent includes: computing an input embedding based on receiving a user input; computing, via a pre-trained machine learning language model, an embedding response inference based on the input embedding; searching, based on the embedding response inference, a response imprintation embedding space that includes a plurality of distinct embedding representations of potential text-based responses to the user input, wherein each of the plurality of distinct embedding representations is tethered to a distinct human-imprinted media response, and searching the response imprintation embedding space includes: (i) defining an embedding search query using the embedding response inference as a search parameter, (ii) searching the response imprintation embedding space based on the embedding search query, and (iii) returning a target embedding representation from the response imprintation embedding space based on the searching of the response imprintation embedding space; and executing, via a user interface of the human video-personified machine learning-based virtual dialogue agent, a human-imprinted media response tethered to the target embedding representation.

In some embodiments, the pre-trained machine learning language model computes the embedding response inference based on an embedding space different from the response imprintation embedding space. In some embodiments, the method includes normalizing the embedding response inference to the response imprintation embedding space contemporaneously with defining the embedding search query.

In some embodiments, searching the response imprintation embedding space includes: (1) computing a distance between the embedding response inference and each of the plurality of distinct embedding representations, and (2) determining which embedding representation of the plurality of distinct embedding representations is closest to the embedding response inference, and the target embedding representation returned from the response imprintation embedding space corresponds to the embedding representation closest to the embedding response inference.

In some embodiments, searching the response imprintation embedding space includes: (1) computing a similarity metric between the embedding response inference and each of the plurality of distinct embedding representations, and (2) determining which embedding representation of the plurality of distinct embedding representation is most similar to the embedding response inference, and the target embedding representation returned from the response imprintation embedding space corresponds to the embedding representation most similar to the embedding response inference.

In some embodiments, the response imprintation embedding space relates to an n-dimensional vector space.

In some embodiments, the method includes contemporaneously with computing the embedding response inference via the pre-trained machine learning language model: computing, via one or more additional pre-trained machine learning language models, one or more additional embedding response inferences based on the input embedding, wherein: searching the response imprintation embedding space is based on the embedding response inference and the one or more additional embedding response inferences, searching the response imprintation embedding space further includes: defining one or more additional embedding search queries based on the one or more additional embedding response inferences; and searching the response imprintation embedding space based on the one or more additional embedding search queries, and the target embedding representation returned from the response imprintation embedding space is based on searching the response imprintation embedding space with the embedding search query and the one or more additional embedding search queries.

In some embodiments, the one or more additional embedding response inferences include a first additional embedding response inference and a second additional embedding response inference, the one or more additional embedding search queries include a first embedding search query based on the first additional embedding response inference and a second embedding search query based on the second additional embedding response inference, searching the response imprintation embedding space based on the first additional embedding search query includes identifying, from the plurality of distinct embedding representations, an embedding representation most similar to the first additional embedding response inference, searching the response imprintation embedding space based on the second additional embedding search query includes identifying, from the plurality of distinct embedding representations, an embedding representation most similar to the second additional embedding response inference, and searching the response imprintation embedding space based on the embedding search query includes identifying, from the plurality of distinct embedding representations, an embedding representation most similar to the embedding response inference.

In some embodiments, searching the response imprintation embedding space further includes: identifying an embedding representation most frequently identified by the embedding search query and the one or more additional search queries; and determining which embedding representation of the plurality of distinct embedding representations is closest to the embedding representation most frequently identified by the embedding search query and the one or more additional search queries, and the target embedding representation returned from the response imprintation embedding space corresponds to the embedding representation determined to be closest to the embedding representation most frequently identified by the embedding search query and the one or more additional search queries.

In some embodiments, searching the response imprintation embedding space further includes: computing an average embedding representation based on embedding representations identified by the embedding search query and the one or more additional search queries; and determining which embedding representation of the plurality of distinct embedding representations is closest to the average embedding representation, and the target embedding representation returned from the response imprintation embedding space corresponds to the embedding representation determined to be closest to the average embedding representation.

In some embodiments, the human-imprinted media response tethered to the target embedding includes a video component, and executing the human-imprinted media response includes: playing the video component of the human-imprinted media response at the user interface of the human video-personified machine learning-based virtual dialogue agent; and displaying, in association with the playing of the video component, a transcript of the human-imprinted media response.

In some embodiments, the user input is received via the user interface of the human video-personified machine learning-based virtual dialogue agent, and the user input comprises textual input that relates to one or more dialogue intents.

In some embodiments, a method of implementing a human-personified machine learning-based virtual dialogue agent includes: computing an input embedding based on a user input; computing, via a pre-trained machine learning language model, an embedding response inference based on the input embedding; searching, based on the embedding response inference, a response imprintation embedding space that includes a plurality of distinct embedding representations of potential text-based responses to the user input, wherein each of the plurality of distinct embedding representations is tethered to a distinct human-imprinted media response, and searching the response imprintation embedding space includes: (i) defining an embedding search query using the embedding response inference as a search parameter, and (ii) executing the embedding search query to search the response imprintation embedding space, wherein the embedding search query returns a target embedding representation from the response imprintation embedding space; and executing, via a user interface of the human-personified machine learning-based virtual dialogue agent, a human-imprinted media response tethered to the target embedding representation.

In some embodiments, the embedding search query returns the target embedding representation because the target embedding representation is closer to the embedding response inference as compared to other embedding representations in the response imprintation embedding space.

In some embodiments, the response imprintation embedding space relates to a multi-dimensional vector space. In some embodiments, the method further includes before searching the response imprintation embedding space, constructing the response imprintation embedding space, wherein constructing the response imprintation embedding space includes: identifying a human-imprinted media response corpus that includes a plurality of distinct human-imprinted media responses to likely user input; generating, via a transcriber, a text-based transcription for each of the plurality of distinct human-imprinted media responses; providing, as input to a pre-trained machine learning language model, the text-based transcription generated for each of the plurality of distinct human-imprinted media responses; computing, by the pre-trained machine learning language model, an embedding representation for each of the plurality of distinct human-imprinted media responses based on the text-based transcription generated for each of the plurality of distinct human-imprinted media responses; mapping the embedding representation computed for each of the plurality of distinct human-imprinted media responses to the multi-dimensional vector space.

In some embodiments, each of the plurality of distinct human-imprinted media responses includes an audio/video (AV) component.

In some embodiments, the user input is received via the user interface of the human-personified machine learning-based virtual dialogue agent, and executing the human-imprinted media response tethered to the target embedding representation includes playing the human-imprinted media response.

In some embodiments, in accordance with a determination that an accessibility setting of the human-personified machine learning-based virtual dialogue agent is toggled on: forgoing playing the human-imprinted media response; and displaying a text-based transcription of the human-imprinted media response at the user interface of the human-personified machine learning-based virtual dialogue agent.

In some embodiments, a method of implementing a fast-generated virtual dialogue agent includes: receiving, via a web-enabled virtual dialogue agent interface, user stimuli; converting, by a computer implementing one or more pre-trained language machine learning models, the user stimuli to a stimuli embeddings inference; computing a response inference based on the stimuli embeddings inference, wherein computing the response inference includes: performing an embeddings search for a response embeddings of a plurality of distinct response embeddings based on the stimuli embeddings inference; and generating an automated response to the user stimuli, via the web-enabled virtual dialogue agent interface, based on the response embeddings.

In some embodiments, the embeddings search searches a multi-dimensional space and identifies which of the plurality of distinct response embeddings is closest to the stimuli embeddings inference.

DESCRIPTION OF THE PREFERRED EMBODIMENTS

The following description of the preferred embodiments of the present application are not intended to limit the inventions to these preferred embodiments, but rather to enable any person skilled in the art to make and use these inventions.

1. System for Generating and Deploying a Machine Learning-Based Virtual Agent

Figure 1:
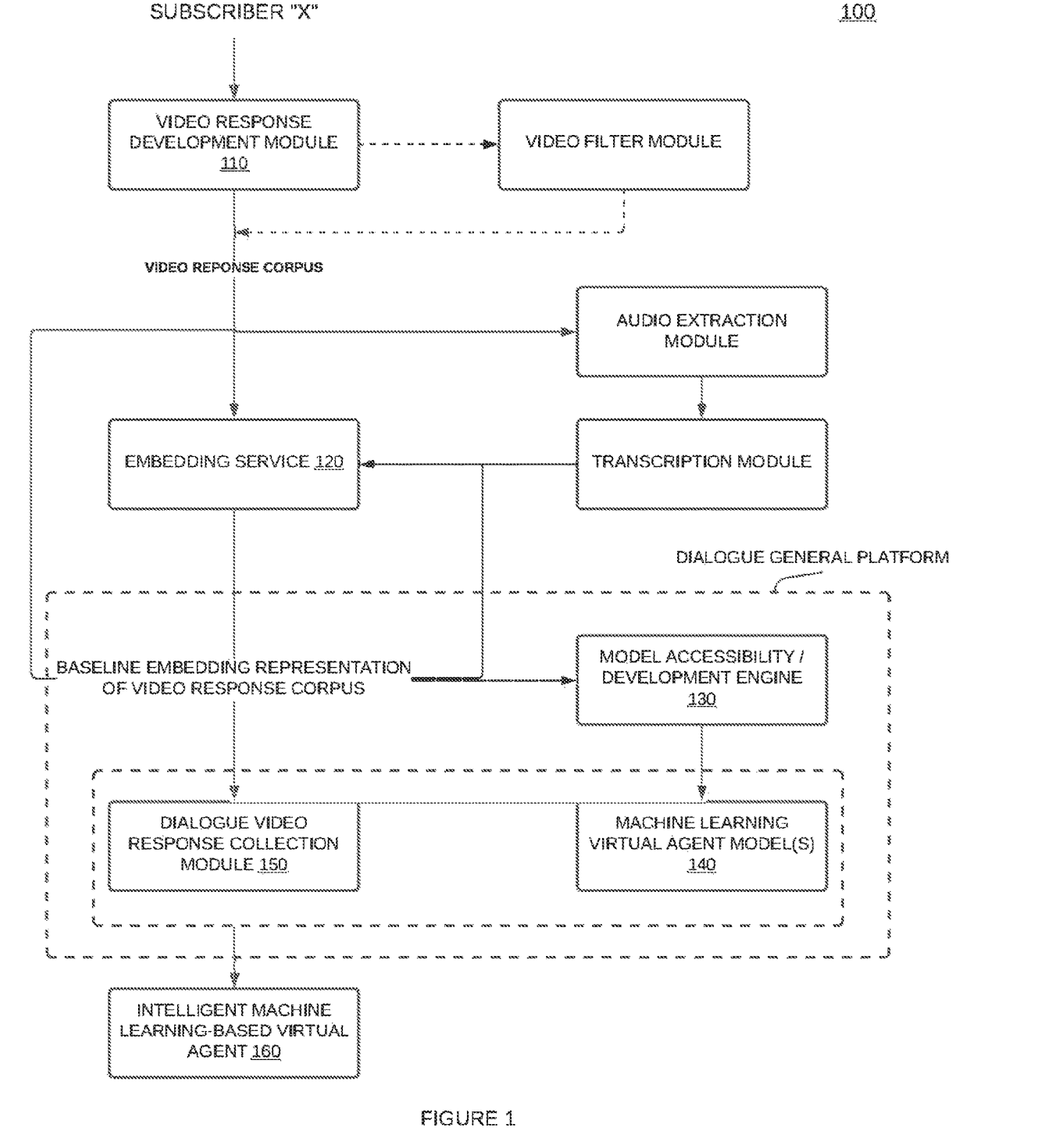
FIG. 1 illustrates a schematic representation of a system in accordance with one or more embodiments of the present application.

As shown in FIG. 1, a system 100 that may configure and deploy a machine learning-based human-personified virtual agent may include a response development module no, an embedding service 120, a model accessibility/development engine 130, a machine learning-based virtual agent model 140, a dialogue response collection module 150, and an intelligent machine learning-based virtual agent 160.

In one or more preferred embodiments, the system 100 may function to configure and/or deploy the intelligent machine learning-based human-personified virtual agent 160 to enable an automated conversational experience between a user and a human-imprinted virtual agent of a subscriber.

1.1 Response Development Module

In one or more embodiments, a response development module no may be in digital communication with a response development interface (or client interface). For instance, the response development module no may be configured to ingest (or identify) responses inputted by a subscriber, at the response development interface, to construct a corpus of responses (e.g., a response corpus).

In one or more embodiments, the response development module 110 may interface with a subscriber that may provide a source of knowledge (or a source of responses) for a machine learning-based virtual agent 160. Accordingly, in one or more embodiments, the response development interface may be configured to allow for manual and/or bulk upload of responses or a response corpus (e.g., a video response corpus) that may be identifiable to the response development module no. In some embodiments, the response development module no may include a response development interface that may be configured to allow a subscriber to manually input a string of text that may define an individual response associated with one or more video response imprints; however, in alternative embodiments, the response development interface may also be configured to accept, as input, documents, files, media files, or the like comprising a collection of responses in bulk.

Additionally, or alternatively, in one or more embodiments, the response development module no may include and/or be in operable communication with an image capturing device or video capturing device that enables a capturing of one or more video response imprints/imprints for building a video response corpus.

Additionally, or alternatively, in some embodiments, the response development module no may include and/or be in operable communication with one or more video response handling module that may function to partition video response imprints according to any suitable known partitioning or segmentation techniques including the one or more video partitioning and segmentation techniques described herein.

In one or more embodiments, the machine learning-based virtual agent 160 (may also be referred to herein as a "machine learning-based virtual assistant" or "machine learning-based human-personified virtual agent) may communicate with an intermediary service that may store the text-based transcriptions of a video response corpus to rapidly identify one or more most likely or most probable responses to user stimulus based on one or more inferred responses of one or more pre-trained machine learning language models.

1.2 Embedding Service

In one or more embodiments, an embedding service 120 may preferably function to receive text-based transcriptions of a video response corpus as input and output an embedded response representation for each response (or response imprint) of the video response corpus. In some embodiments, the embedding service may be a sentence/word (or text) embeddings service that may be configured to compute embedded response representations.

Additionally, or alternatively, the embedding service 120 may function to generate an embedded response space that may map each of the computed embedded response representations associated with a corresponding response (or response imprint) of the response corpus to the embedded response space. In one or more embodiments, the embedded response space may function to graphically associate (or cluster) semantically similar responses closer to one another than unrelated (or dissimilar) responses.

1.3 Model Accessibility/Development Engine

In one or more embodiments, the model accessibility/development engine 130 may preferably include storing and/or at least capable of accessing a plurality of pre-trained and/or pre-developed language processing models. In some embodiments, each of the plurality of language processing models may be pre-developed and/or pre-trained for reading, understanding, interpreting human language, and/or making predictions based on user inputs or user stimuli.

Additionally, in some embodiments, the model accessibility/development engine 130 may store and/or identify the baseline embedded response representations computed by the embedding service 120 to identify and/or select one or more applicable pre-trained language processing models based, in part, on the embedding values. In some embodiments, an algorithmic structure of the machine learning virtual agent model 140 underlying the virtual dialogue agent 160 may be the entirety of the plurality of accessed pre-trained language processing models and/or the stored language processing models outputted by the model accessibility/development engine 130.

In a preferred embodiment, the machine learning virtual agent model 140 that may be accessed, generated, and/or outputted by the model accessibility/development engine 130 may be capable of predicting and/or inferring responses based on user input.

Additionally, or alternatively, the model accessibility/development engine 130 may implement one or more ensembles of pre-trained or trained machine learning models. The one or more ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C 4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein.

1.4 Dialogue Response Collection Module

In one or more embodiments, the dialogue response collection module 150 may preferably function as the response repository for the machine learning-based virtual agent 160. Accordingly, in one or more preferred embodiments, the response collection module 150 may be configured to collect and/or store the constructed response corpus generated by the response development module no and the embedded response representations of the response corpus computed by the embedding service 120.

Additionally, in one or more preferred embodiments, the response collection module 150 may be combinable (or associated) with the selected or the identified machine learning virtual agent model(s) 140 (e.g., the pre-trained language processing models) outputted by the model accessibility/development engine 130 to form the underlying structure of the virtual dialogue agent 160.

2. Method for Configuring a Human-Personified Machine Learning Virtual Agent

Figure 2:
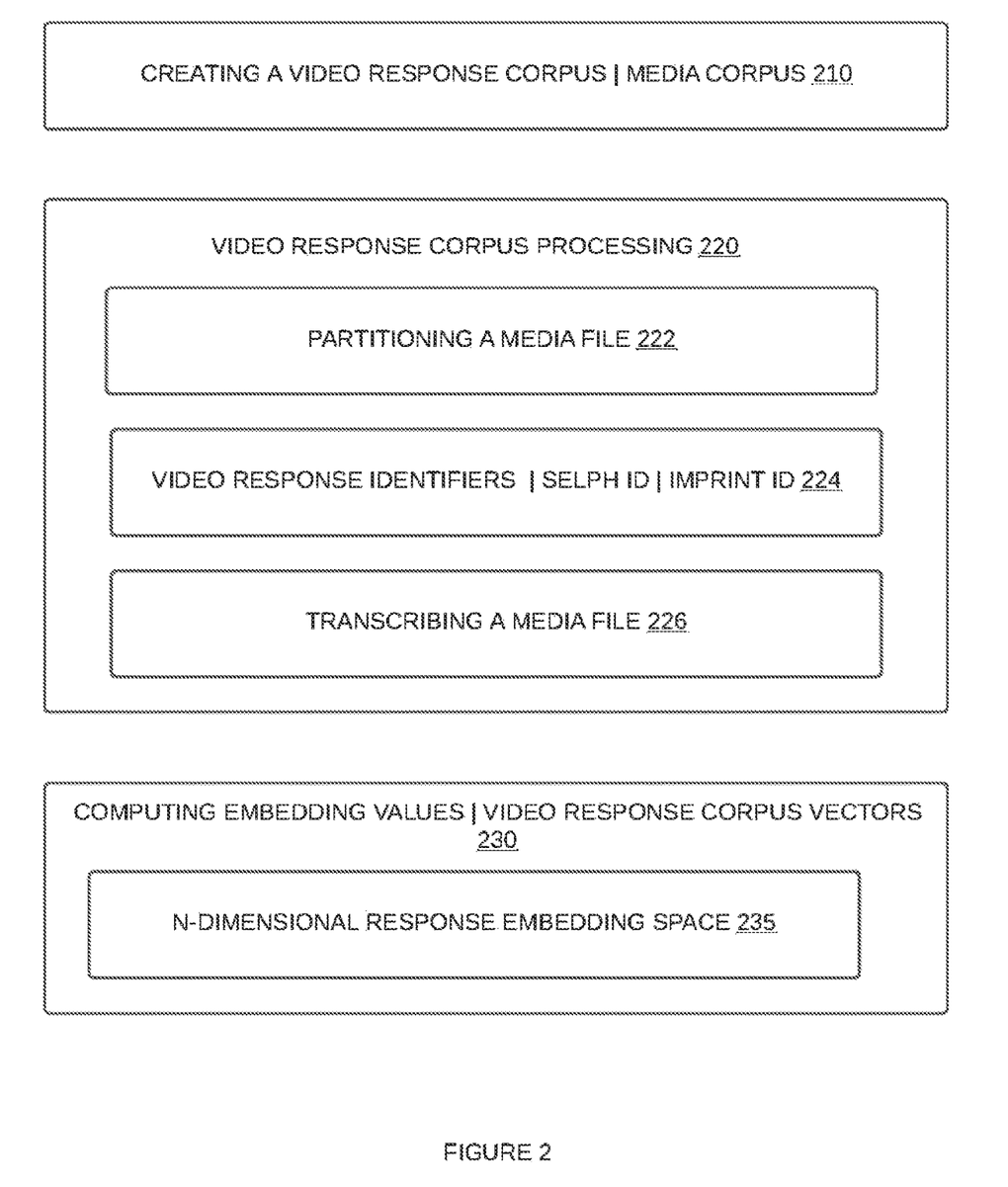
FIG. 2 illustrates an example method of configuring a human-personified virtual agent in accordance with one or more embodiments of the present application.

As shown in FIG. 2, the method 200 for configuring a machine learning-based human-personified virtual agent includes creating a video response corpus S210, intelligently processing the video response corpus S220, and computing and storing embedding values based on the video response corpus S230. The method 200 optionally includes creating a mapping of embedded response representations of the video response corpus S235.

2.10 Creating a Video Response Corpus|Media Corpus

S210, which includes identifying and/or creating a video response corpus, may function to create a plurality of expected and/or desired video responses to user stimulus or user utterances to a virtual agent. In a preferred embodiment, video responses may be created and/or obtained from any suitable source including, but not limited to, human agent responses, manuscripts, transcriptions, any video storage database, and/or the like. An expected and/or desired video response may sometimes be referred to herein as a "video response item" or a "video response imprint". A video response imprint preferably includes a recording or imprintation of a human providing a response to a query, utterance, user communication, or the like.

Figure 4:
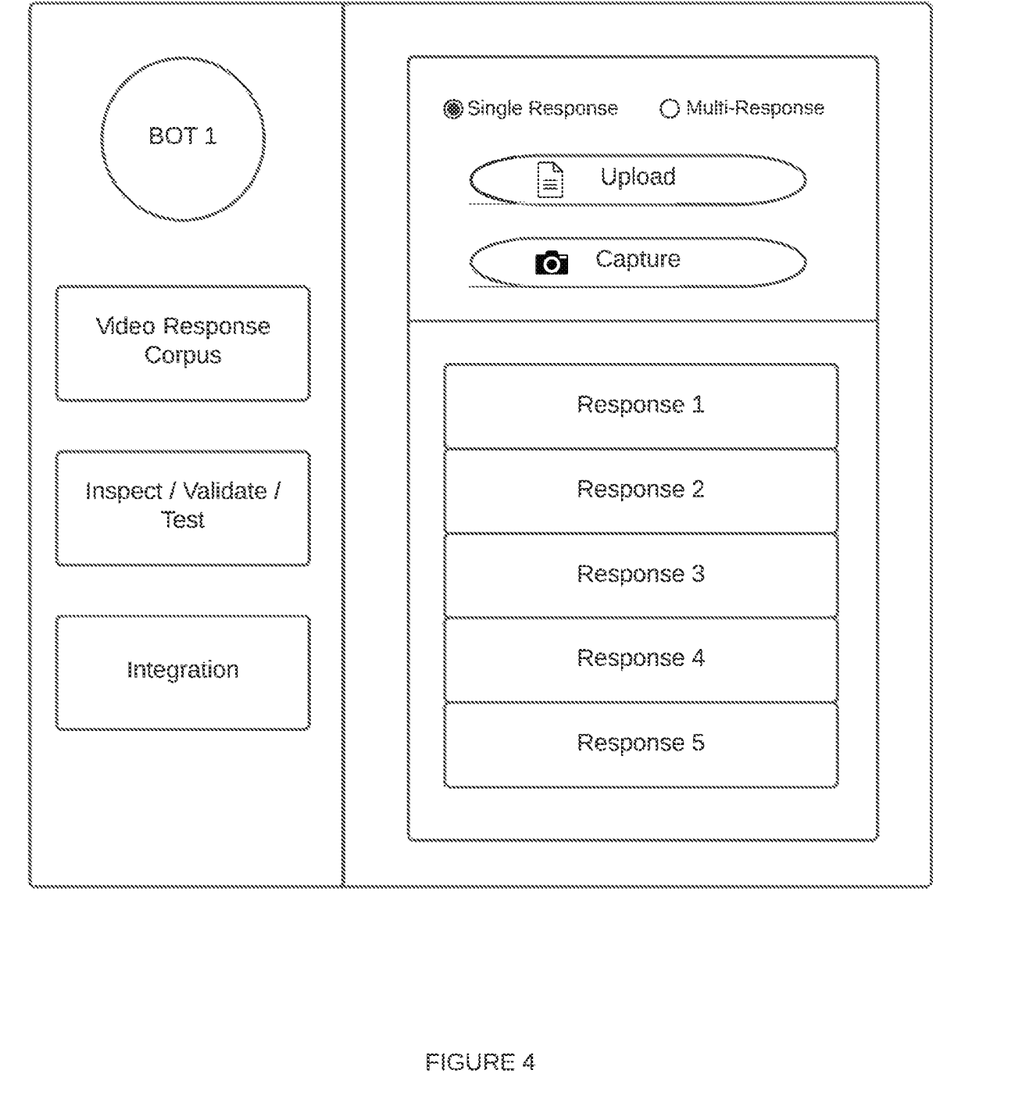
FIG. 4 illustrates a schematic representation for creating a single response video imprint in accordance with one or more embodiments of the present application.

In a first implementation, a video response imprint may be created by an abridged recording, as shown by way of example in FIG. 4. In such implementation, a human agent or a subscriber may create and/or upload one or more video response imprints that may include one or more short or abridged videos of themselves and/or another person responding to an expected user stimulus and/or utterance. Further, in such implementation, an "abridged recording" or "single response recording" as referred to herein preferably relates to a video recording response imprint that includes a single expected or desired response to user stimulus.

Figure 5:
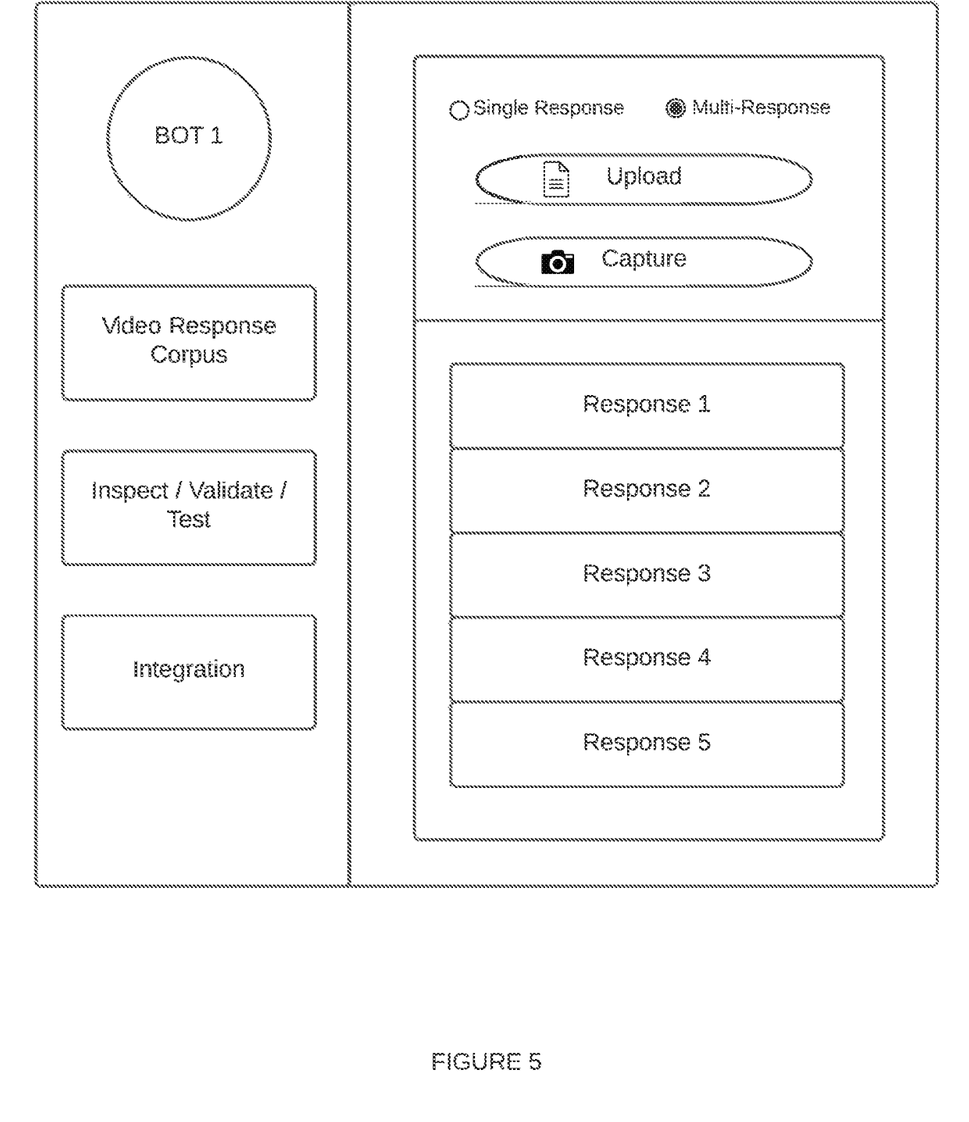
FIG. 5 illustrates a schematic representation for creating a multiple response video imprint in accordance with one or more embodiments of the present application.

In a second implementation, video response imprints may be obtained by an extended recording, as shown by way of example in FIG. 5. In such implementation, subscribers may create and/or upload video response imprints of recordings from a longer or extended video of themselves and/or another person responding to one or more expected user stimulus' and/or utterances. Additionally, or alternatively, as will be further described below (e.g., in S222), longer video response imprints may be partitioned into smaller video response (sub-)imprints. Further, in such implementation, an "extended recording," as referred to herein, preferably relates to a video recording response imprint that includes multiple expected or desired responses, preferably that each relate to a single dialogue category or dialogue domain.

In either of the implementations described above, an image capturing device (e.g., a video recording camera) may be used by a human agent to create a video response imprint that includes a video recording of themselves or of another human person or agent providing one or more responses for creating a response corpus of a target virtual agent.

Additionally, or alternatively, in one variant implementation, S210 may function to create a video response corpus which may include a plurality of distinct video response imprints or a multi- or single video response imprint that may be pre-recorded. That is, in some embodiments, rather than creating the video response corpus by making one or more human-based or human-imprinted recordings with expected or desired response to user stimuli, S210 may function to search and/or source any available repository (e.g., the Internet, YouTube, Google, etc.) having human-based pre-recordings that may include a desired response or an expected response to a user stimulus.

It shall be recognized that in some embodiments, the method 200, the method 300 or the like may function to implement any suitable combination of the above-described configuration parameters to create a media file, video response imprint, and/or the like.

2.20 Video Response Corpus Processing

S220, which includes intelligently processing the video response corpus, may function to intelligently process a video response corpus to enable a consumption of the content therein for a machine learning-based virtual agent. In one or more embodiments, pre-processing the video response corpus may include partitioning or chunking one or more video response imprints, extracting audio features, and/or transcribing audio features into a consumable or prescribed format (e.g., a textual format), such as an input format suitable for a machine learning virtual agent generation component of a service or system implementing one or more steps of the method 200.

2.22 Partitioning a Video Response Imprint

Optionally, or additionally, S220 includes S222, which may function to partition or chunk a video response imprint of the video response corpus. In one or more embodiments, S222 may function to identify that partitioning of a subject video response imprint may be required based on the subject video response imprint having therein multiple distinct responses satisfying a partitioning threshold (e.g., a minimum number of responses to one or more stimuli). Additionally, or alternatively, in one or more embodiments, S222 may determine that a partitioning of a video response imprint may be required based on a length of the video response imprint, the file size of the video response imprint, and/or the like.

In a first implementation, S222 may function to partition a video response imprint using an intelligent partitioning scheme. In such implementation, S222 may determine a partition location of the video response imprint if there is a suitable pause within the audio of the response. In some embodiments, a suitable pause length for partitioning the video response imprint may be identified based on a discontinuance of a verbal communication by a human agent within the video and lapse of a predetermined amount of time (e.g., pause length). The pause length, pause threshold, and/or decibel level of the sound of the intelligent partitioning may be adjusted according to each subscriber, video response, etc.

In a second implementation, S222 may function to partition a video response imprint using identification partitioning. In such implementation, S222 may determine a partition location of the video response imprint if a user voices a specified keyword and/or phrase or performs an action, such as a predetermined gesture indicating that a partition or break in the video response imprint should be made. For example, the user may pronounce a predetermined keyword, an expected user utterance, and/or the like before articulating their expected response. In another example, a human agent in the recording may make a "thumbs up" gesture or similar gesture indicating a point or section for partitioning the video response imprint.

In a third implementation, S222 may function to partition a video response imprint using interval partitioning. In such implementation, S222 may function to partition a video response imprint every 'x' number of seconds. For example, a subscriber may determine that every 10 seconds they'd like the video response to be partitioned. Additionally, or alternatively, the video response imprint may be evenly partitioned into halves, quarters, eighths, and/or the like.

Additionally, or alternatively, the partitioning may be implemented in any suitable manner. In one implementation, S222 may function to partition a video response imprint by demarcating multiple distinct time segments of the video response imprint. In such implementation, S222 may include pairs of digital markers within the video response imprint in which a first marker of the pair of digital markers may indicate a beginning of a time segment (i.e., sub-video response imprint) and a second marker of the pair may indicate a termination or ending of the time segment. In a second implementation, S222 may function to partition a video response imprint by defining each of a plurality of time segments of the video response imprint, extracting each time segment, and storing the extracted time segments independently. That is, in this second implementation, S222 may function to break a video response imprint having multiple responses into multiple distinct sub-videos.

It shall be recognized that in some embodiments, the method 200 or the like may function to implement any suitable video partitioning scheme including a partitioning scheme based on a combination of the above-described techniques or schemes for partition a media file, and/or the like.

2.24 Video Response Identifiers|Selph ID|Imprint ID

Additionally, or alternatively, S220 includes S224, which may function to generate and/or assign one or more unique identifiers to each video response corpus and to each of the video response items/imprints within the video response corpus. In a preferred embodiment, S224 may function to identify or assign a global identifier to each distinct video response corpus or to each collection of video responses that may be related in content (e.g., same domain or category). Additionally, or alternatively, S224 may function to identify or assign a unique local identifier to video response item/imprint within a given video response corpus.

In one or more embodiments, the global identifier may be referred to herein as one of a "Selph ID" or a "corpus identifier (ID)". In such embodiments, the global identifier may function to identify a subject video response corpus as distinctly including video response imprints within a dialogue category or dialogue domain. That is, the global identifier may indicate an overarching category or domain of the video response content within the group. For example, S224 may function to assign a first global identifier to a first video response corpus in which substantially or all the video response imprints relate to a single, first primary category, such as "air travel," and may function to assign a second global identifier to a second video response corpus in which substantially or all the video response imprints to a single, first primary category, such as "automotive repair."

In one or more embodiments, the local identifier may be referred to herein as one of an "imprint identifier (ID)," a "video response identifier (ID)," or a "video response imprint ID." In such embodiments, the local identifier may function as a sub-domain or sub-category identifier that identifies an associated video response imprint as a specific sub-topic or sub-category within a video response corpus. Additionally, or alternatively, each partition of a video response imprint may be assigned a distinct imprint ID for ease of reference, lookup, and/or publishing as a response to a user stimulus.

It shall be recognized that, in one or more embodiments, a video response corpus and a plurality of distinct video response imprints within the video response corpus may be assigned identifiers (i.e., global and local identifiers) based on a hierarchical identification structure in which a video response corpus may be assigned a global identifier corresponding to a top-level category or top-level domain and each of the video response imprints with the video response corpus may be assigned a local identifier corresponding to one or more distinct sub-level categories or sub-level domains. In one example, a video response corpus may be assigned a global identifier such as "air travel", which may function as a top-level domain, and a first video response imprint within the video response corpus may be assigned a first local identifier of "scheduling flight" and a second video response imprint within the video response corpus may be assigned a second local identifier of "flight status". In this example, each of the first local identifier of "scheduling flight" and the second local identifier of "flight status" may be sub-level categories of the top-level category of "air travel."

In a first implementation, either the global and/or local identifiers associated with either the video response corpus or distinct video response imprints may be implemented in tracking operations and/or processes involving or being applied to either the video response corpus or a distinct video response items/imprints. In a second implementation, either the global and/or local identifiers may be implemented for sourcing or obtaining one or more public URLs of one or more target video response imprints preferably during an interaction between a user and a human-personified virtual dialogue agent. In a third implementation, either the global and/or local identifiers may be implemented for response linking and may be electronically associated with an answer object or the like of a chatbot or virtual agent generation service.

As will be further discussed below, the system 100 and/or the method 200 may function to convert the identified (or constructed) video response corpus of S220 into embedding values (e.g., embedded response representations).

2.26 Transcribing a Video Response Imprint

Optionally, or additionally, S220 includes S226, which may function to create a transcription of each video response item/imprint of a video response corpus. In one or more embodiments, the transcription of a given video response imprint may include a textual representation of an audio component or verbal response component within the given video response imprint or any media file.

In one embodiment, S226 may function to interface with a transcriber or a transcription service for automatically generating a transcription of a subject video response imprint. In such embodiment, S226 may function to transmit, via a network and/or via an API, the subject video response imprint together with local identifier data (e.g., an imprint ID) to the transcription service that may function to create a transcription of the subject video response imprint.

In another embodiment, S226 may function to implement a transcription module or the like that may include one or more language models that may function to automatically transcribe an audio component of a subject video response imprint to a text representation.

In the circumstance that a transcription of a video response imprint includes a plurality of distinct responses, S226 may additionally or alternatively function to partition the transcription into a plurality of distinct transcriptions corresponding to the plurality of distinct responses. In one embodiment, S226 may function to partition the transcription based on identifying one or more points of silence (e.g., gaps of text between text representations of the transcription). It shall be noted that any suitable technique for partitioning a transcription of a video response imprint may be implemented.

In a preferred embodiment, a transcription for a given video response imprint may be stored in electronic association with the given video from which the transcription was created together with the local and/or global identifier of the given video response.

2.30 Computing Embedding Values|Video Response Corpus Vectors

S230, which includes computing and storing embedding values based on the video response corpus, may function to convert or generate vector representations or text representations for each response imprint (e.g., each anchor response) of the video response corpus. In one or more preferred embodiments, S230 may function to implement a sentence or text embedding service or language model that may function to convert transcriptions of response imprints of the video response corpus into numerical-based vector representations.

In one implementation, the sentence or text embedding service or model that may be implemented for converting each transcription of each video response imprint in the video response corpus may be the same or substantially similar to an embedding service or model implemented with a pre-trained machine learning (language) model, described herein. In such implementation because the embedding service or model may be the same for converting the video response corpus and training samples or other model inputs of the pre-trained language model, S230 may function to map the vector representations for each response imprint in the video response corpus to an n-dimensional vector space that may be familiar, known, and/or used by the pre-trained language model.

Additionally, or alternatively, in some embodiments, the method 200 may function to implement a plurality of distinct pre-trained language models that may each include an embedding layer (i.e., a hidden layer) or implement a distinct embedding service or language model. In such embodiments, S230 may function to compute one or more distinct sets of embedding values for the video response imprints of the video response corpus using an embedding layer of a pre-trained language model or using one or more of a plurality of distinct embedding services or models that may be used by the pre-trained language models.

For instance, in one or more embodiments that may include using a sentence or text embedding service to generate text representations based on an input of the video response corpus, S230 may function to generate a distinct text representation for each of the plurality of distinct response imprints of the video response corpus.

In a first implementation, S230 may function to sequentially or individually input each response imprint of the video response corpus through an embedding service or language model to create an associated baseline embedded response representation. In such example, a transcription of a first response of the video response corpus (e.g., The delivery fee is $3) may be converted to a first embedded response representation, a transcription of a second response of the video response corpus (e.g., We have a wide selection of vegetarian pizzas) may be converted to a second embedded response representation distinct from the first embedded response representation, and a transcription of a third response of the video response corpus (e.g., Your order will arrive in 30 minutes) may be converted to a third embedded response representation distinct from the first embedded response representation and the second embedded response representation. Stated another way, each transcription of a response of the video response corpus may be an individual input into the sentence or text embedding service to compute a corresponding individual output of an embedded response representation. At least one technical benefit of an individual or discrete approach for creating an embedding representation for each response imprint of a response corpus may include an ability to specifically track a correspondence between a respective response imprint and its computed embedded representation thereby enabling a capability to specifically tune or adjust the computed embedded representation within a given multi-dimensional space for embedding values.

Alternatively, in a second implementation, S230 may function to input a set of transcriptions of the video response corpus of S210 through an embedding service to create a set of embedded response representations (e.g., $M_r$). In other words, the input into the embedding service may be the entire response corpus and the output (e.g., after processing the video response corpus through the embedding service) may be a set of baseline embedded response representations.

In operation, S230 may function to implement any suitable and/or combination of suitable sentence (or text) embeddings techniques or services to compute embedded response representations. Accordingly, in the case that the identified response corpus may span across a diverse set of text representations (or vector values), S230 may function to identify or define the range of embedding values associated with the video response imprints of the video response corpus.

2.35 N-Dimensional Response Embedding Space

Optionally, S230 includes S235, which may function to associate or map each embedded response representation (or embedded vector representation) of the video response corpus into a multi-dimensional vector space (e.g., an n-dimensional embeddings space), that, in one or more embodiments, may be graphically illustrated. In other words, each vector representation of each distinct string of text or word that may define a distinct response of the video response corpus may be used as input for creating a mapping item or a point that may be positioned onto the multi-dimensional embedding space.

Accordingly, in such preferred embodiment, the embedded response space (e.g., the n-dimensional embedded response space) may be constructed based on mapping the embedded response representations for each response imprint of the video response corpus. For example, S230 may function to map each embedded response representation that may define a coordinate or vector onto the embedded response space.

Additionally, or optionally, each of the embedded representations may be linked, coupled, and/or associated with the anchor response and/or the system-displayed response.

It shall be noted that responses of the video response corpus that may share one or more similar characteristics (e.g., response categories, semantically similar responses within a similarity threshold value) or that may have semantically similar meanings may be mapped (or clustered) proximate to one another, in the embedded response space, when compared to unrelated (e.g., dissimilar) responses.

It shall be noted that each of the video response corpus, the embeddings values for the video response corpus, and/or the n-dimensional mapping of the embeddings values of the video response corpus, may sometimes be referred to herein as the "dialogue agent response collection", may be stored in association with one another when configured for a specific virtual dialogue agent. Preferably, the dialogue agent response collection may be stored by an instant-virtual agent generation service or the like for creating chatbots or virtual dialogue agents.

3. Method for Implementing a Machine Learning Human-Personified Virtual Agent

Figure 3:
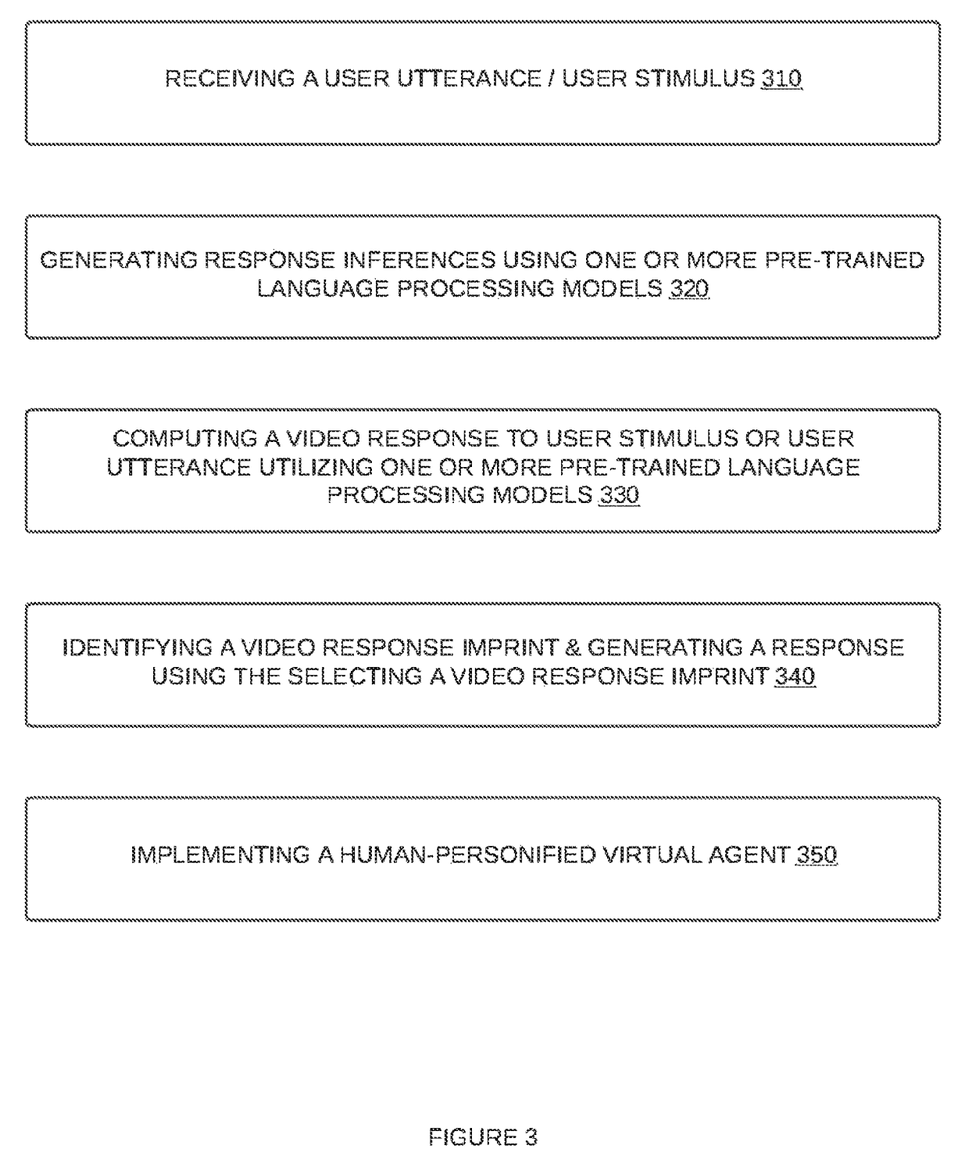
FIG. 3 illustrates an example method of implementing a human-personified virtual agent in accordance with one or more embodiments of the present application.

As shown in FIG. 3, the method 300 for implementing a machine learning-based human-personified virtual dialogue agent includes identifying user stimulus data S310, generating a machine learning-based response inference S320, computing a video response imprint (ID) based on the machine learning-based response inference S330, selecting a video response imprint based on a video response imprint ID S340, and implementing a human-personified virtual agent based on the video response S350.

3.10 Receiving a User Utterance/User Stimulus

S310, which includes identifying user stimulus data, may function to identify, collect, and/or receive user input data in the form of a user utterance or user stimulus towards one or more human-personified virtual dialogue agents deployed in a production environment of a subscriber. It shall be noted that one or more of the virtual agents deployed in a production environment of a subscriber may be associated with a distinct video response corpus previously configured with a chat agent generation service or the like.

In a preferred embodiment, S310 may function to receive a user input or user stimulus via a user interface (e.g., an interface of the virtual dialogue agent) accessible by or provided to the user. It shall be noted that, in one or more embodiments, the interface of the virtual dialogue agent may be accessible by a plurality of channels, including but not limited to, a mobile computing device, a web browser (having a website displayed therein), a social network interface, or any other suitable channel or client interface/device for deploying the virtual dialogue agent.

In one or more embodiments, the user utterance or user stimulus may include, but should be not limited to, speech or utterance input, textual input, gesture input, touch input, character input, numerical input, image input and/or any other suitable type of input. It shall be noted that, in one or more embodiments, the user utterance or user stimulus identified, collected, and or received by S310 may be of a single dialogue intent or a plurality of dialogue intents. Additionally, or alternatively, the identified, collected, and or received user stimulus or user utterance may relate to a single dialogue domain or a plurality of dialogue domains.

It shall be noted that, in one or more embodiments, S310 may function to identify, receive, and/or collect the user stimulus or user utterance and transmit, via a computer network or the like, the user stimulus or user utterance to an embedding service that may convert or translate the user stimulus or user utterance into an embedded representation consumable by one or more pre-trained language processing models for producing one or more response inferences or response predictions ("input embedding").

In one or more alternative embodiments, S310 may function to directly pass the user input or user stimulus, in a raw state, to one or more of the pre-trained language processing models that may include an embedding layer used to generate embedding values for input into one or more inference layers of the models for producing one or more response inferences.

As will be further discussed below, in one or more embodiments, the embedded or vector representation associated with a user utterance or user stimulus may assist with providing the system 100, the method 200, and/or the method 300 the capability of understanding a relational strength between the embedded representation of the user stimulus or the user utterance and the embedded response representations of the video response corpus for intelligently aiding and/or improving a conversational experience.

3.20 Generating Response Inferences Utilizing One or More Pre-Trained Language Processing Models S320, which includes generating a response inference, may function to provide the user communication or user stimulus as input to one or more pre-trained language models. In some embodiments, a chatbot generation service or the like may function as an intermediary between a client interface implementing a virtual dialogue agent (e.g., a subscriber system) and one or more remote or cloud-based systems implementing the one or more pre-trained language models. In such embodiments, S320 may function to provide or transmit the user stimulus from the client interface (i.e., the virtual dialogue interface) together with a global identifier or Selph ID of a subject virtual dialogue agent to the chatbot generation service and in response to a receipt of the user stimulus, the chatbot generation service may function to directly interface with the one or more pre-trained language models for generating at least one response inference based on the user stimulus.

In operation, S320 may function to operably communicate with (e.g., access, retrieve, or the like) one or more of the plurality of pre-trained language processing models identified within the system 100 and/or by the method 200 or the like. For example, in one or more embodiments, S320 may digitally communicate or digitally interface with one or more of a plurality of language processing models via an application programming interface (API) that may programmatically integrate both the system 100 (implementing the method 200 and method 300) and foreign or third-party systems implementing the one or more pre-trained language processing models. That is, S320 may function to access one or more of the plurality of pre-trained language processing models by requesting or generating one or more API calls that include user stimulus data to APIs of one or more of the pre-trained language processing models for producing one or more inferred responses to the user stimulus.

Accordingly, in one or more embodiments, as the plurality of pre-trained language processing models may be pre-developed and/or pre-trained whereby each of the plurality of pre-trained language processing models may have corresponding configured parameters (e.g., learned weights), the parameters (or weights) of the plurality of language processing models may vary between the distinct pre-trained language models. As a result, each of the distinct language processing models that may process the user stimulus or the user utterance differently and may use distinct embedding models to generate a distinct embedded query representation and may compute a predicted (e.g., embeddings) response inference that may vary from other language processing models. For instance, S320 may function to process the user stimulus or user utterance through a plurality of language processing models and each of the language processing models of the plurality of language processing models may be associated with a distinct embeddings models that generates a distinct user stimulus representation.

Figure 6:
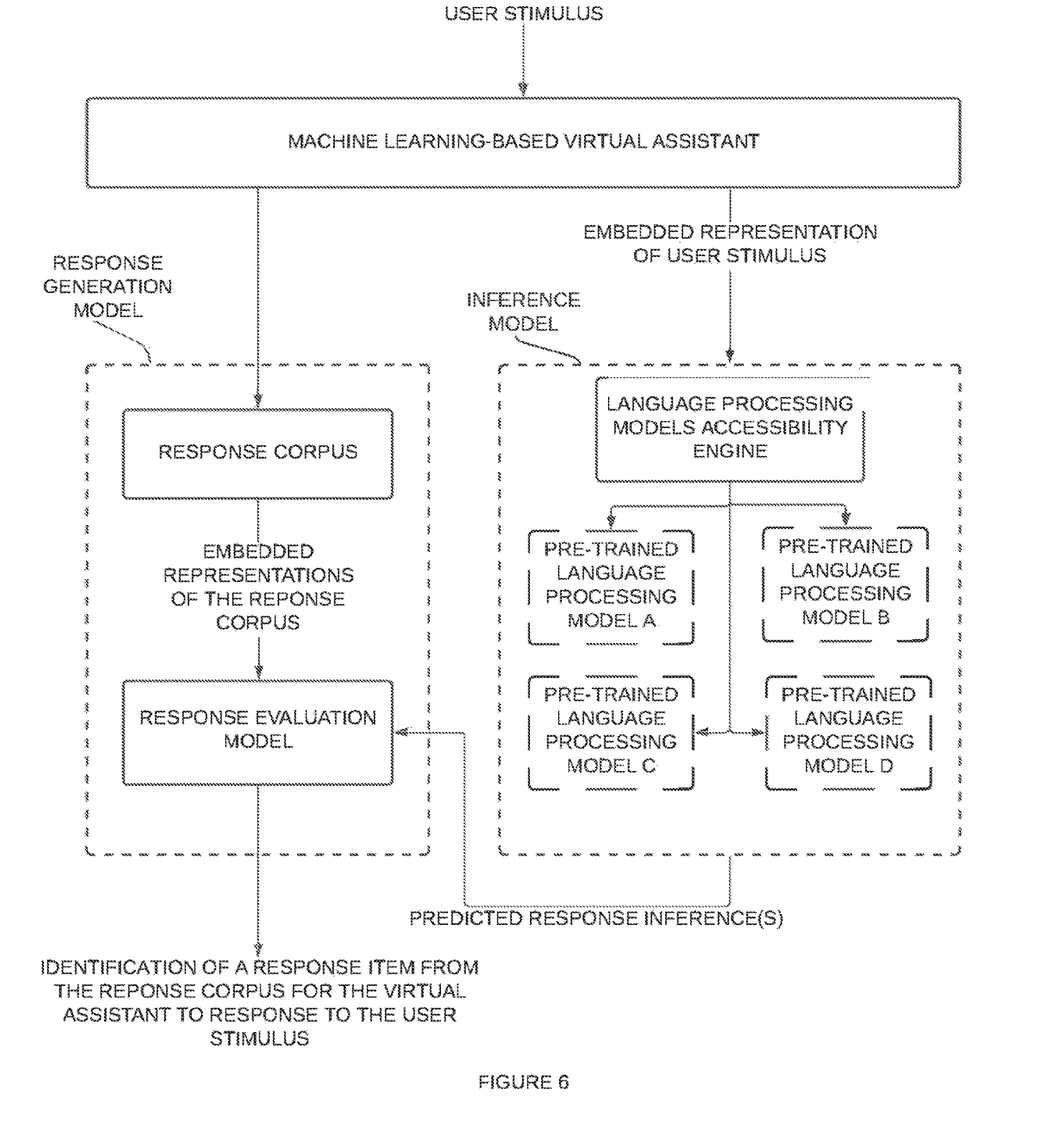
FIG. 6 illustrates a schematic representation of processing a response via a human-personified virtual agent in accordance with one or more embodiments of the present application.

3.30 Computing a Video Response to User Stimulus or User Utterance Utilizing One or More Pre-Trained Language Processing Models S330, which includes computing a video response imprint (ID) based on the machine learning-based response inference, may function to intelligently identify a response to the user stimulus or user utterance based on computationally (e.g., spatially, numerically, etc.) evaluating one or more predicted responses or response inferences of the one or more pre-trained language models against the embedded response representations of the video response corpus for a subject virtual dialogue agent, as shown by way of example in FIG. 6.

In one or more preferred embodiments, S330 may function to evaluate each embedded response representation or a subset of the embedded response representations of the video response corpus with reference to each response inference computed by the plurality of pre-trained language processing models based on the user stimulus.

In one or more embodiments, if the embedding vector values of an evaluation are based on different embedding models having different vector value ranges or the like, the embedded response representations of the video response corpus and the embedded representations of the user stimulus may be normalized to one another. In this way, S330 may function to compute a similarity metric between an inferred response and one or more embedded response representations of the video response corpus. In such embodiments, the computation of the similarity metric may include mathematically computing a distance value or a distance similarity metric between each embedded response representation of the video response corpus and each inferred response representation produced based on the user stimulus to thereby intelligently identify an optimal or most probable response based on the quantitative analysis of the mathematically computed distance therebetween. It shall be noted that a shorter distance between an embedded response representation and an inferred response representation may express that the two embedded representations signify a higher degree of similarity, and vice versa.

Stated differently, each response imprint of the video response corpus may be associated with a corresponding embedded response representation and preferably mapped to an embedded response space and the user stimulus may be associated with one or more inference responses or inference response vectors. In one or more embodiments, the inference response vector may sometimes be mapped to an n-dimensional space and compared or evaluated against a mapping of the embedding values of the video response corpus for a subject virtual dialogue agent.

Additionally, or alternatively, in some embodiments, the inference response vector may be mapped directly to the n-dimensional space of the embedding values of the video response corpus. Accordingly, S330 may function to mathematically compute, for each inference response to the user stimulus produced by the one or more the pre-trained language processing models, which embedded response representation of the video response corpus provides the most likely or most probable response to the user utterance or user stimulus through a similarity (or distance) analysis.

For example, in one or more embodiments, S330 may perform a quantitative measurement that computes a distance between each embedded response representation of the video response corpus and each inferred response representation that may be computed based on an input of the user stimulus. Accordingly, S330 may further function to identify or select which response from the plurality of responses of the video response corpus that may be the most likely response to the user stimulus by identifying the embedded response representation with the smallest (or shortest) distance to the inferred response representation.

It shall be noted that, in one or more embodiments, the selected or optimal response (vector, item) to the user stimulus may be the embedded response representation that occurs with the highest frequency based on the results of the similarity analysis performed for multiple, distinct inferred responses of the plurality of distinct pre-trained language models. For instance, if three (3) distinct response inferences map to a first embedding value of a first response (R_1) of the video response corpus based on similarity and two (2) distinct response inferences map to a second embedding value of a second response (R_2), S330 may function to select the first response, R_1, as the most likely or most probable response to the user stimulus since there is a higher frequency of similarity mapping between the inferred responses of the pre-trained language models and a given embedded representation of a response imprint of the video response corpus of a given virtual dialogue agent.

Additionally, or alternatively, in one or more embodiments, the inferred response representation generated by each of the plurality of pre-trained language processing models may be averaged together and the averaged inferred response representation may be used for the similarity analysis computations. In one example, S330 may function to source three (3) response inferences or response predictions from three distinct pre-trained machine learning models based on a given user stimulus. In this example, S330 may function to compute an average inference vector value based on the 3 response inferences and compute a similarity metric between the average vector value and one or more embedded values of the video response corpus of a subject virtual dialogue agent.

Accordingly, based on a response computation between the one or more inferred responses of the one or more pre-trained language models and the embedding values of the transcripts of the one or more video response imprints of a video response corpus, S330 may function to identify the most probable or most likely (e.g., best or optimal) video response imprint for responding to the user stimulus. In one embodiment, S330 may function to identify a text-based transcript or the like associated with most probable the video response imprint together with an associated local identifier (e.g., imprint identifier) and return a copy of the text-based transcript of a video response imprint, the imprint ID, and/or the Selph ID to a source of the user stimulus (e.g., subscriber system, client interface, etc.).

3.40 Identifying a Video Response Imprint & Generating a Response Using the Selecting a Video Response Imprint S340, which includes selecting a video response imprint based on a video response imprint ID, may function to generate a response via the virtual dialogue agent based on the identified text-based transcript and/or imprint ID of a video response imprint.

In one embodiment, in response to receiving or identifying the text-based transcript of the video response imprint with a corresponding local identifier or imprint ID, S340 may function to evaluate one or more of the text-based transcript and imprint ID against the one or more video response imprints of a video response corpus. In such embodiment, based on the evaluation, S340 may function to identify a video response imprint and/or associated time segment or partition of a video response imprint for responding to the user stimulus.

In the circumstance that the video response corpus includes a single video having a sequence of distinct video response imprints partitioned based on time segments and each video response imprint of the sequence having a unique imprint ID, S340 may function to evaluate and/or compare the identified imprint ID along the sequence of video response imprints or time segments and identify a video response imprint or time segment that matches the identified imprint ID.

Additionally, or alternatively, in the circumstance that the video response corpus includes a plurality of distinct video response imprints with each video response imprint being stored independently of one another, S340 may function to individually evaluate and/or compare the identified imprint ID to each video response imprint and an associated imprint ID to identify a video response imprint having an imprint ID that matches the identified imprint ID.

3.50 Implementing a Human-Personified Virtual Agent

Figure 7:
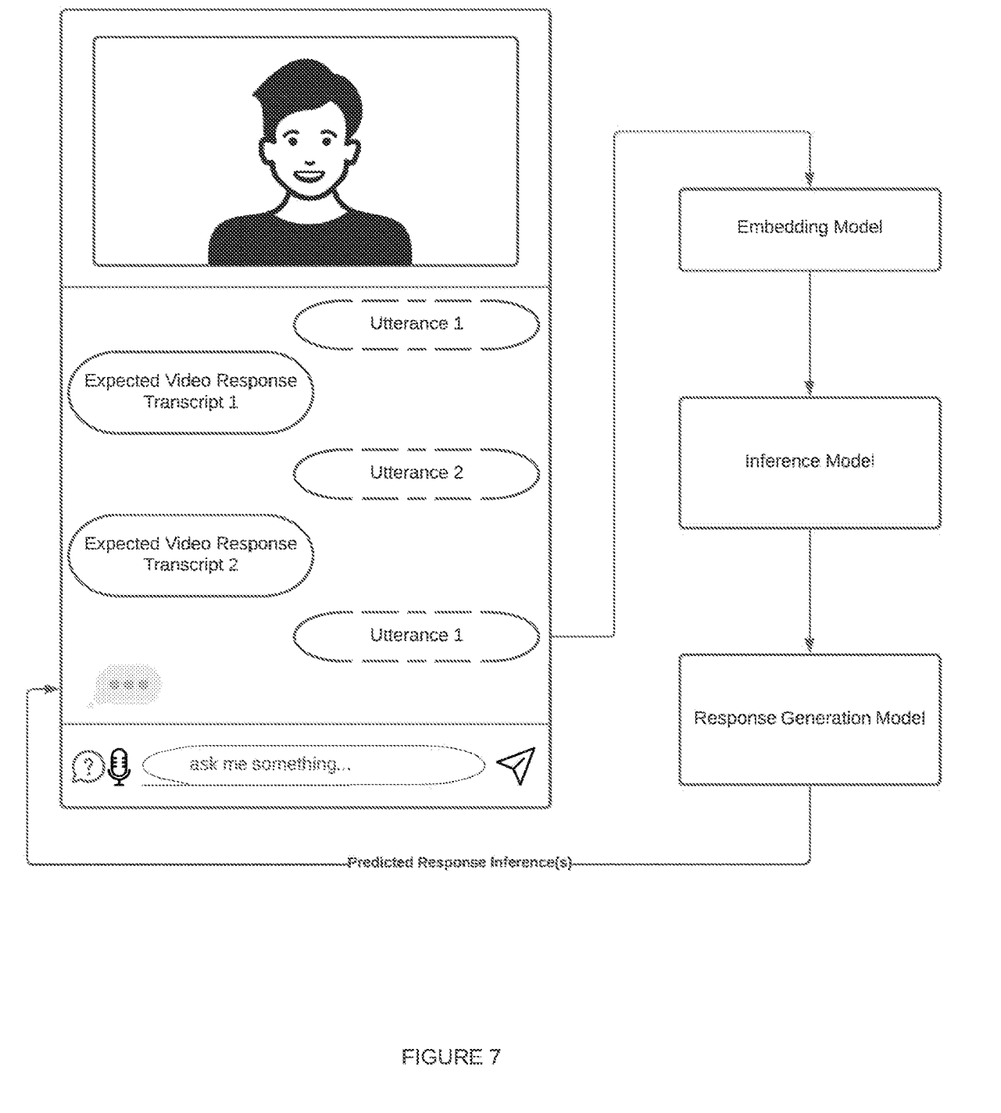
FIG. 7 illustrates a schematic representation of interfacing with a human-personified virtual agent in accordance with one or more embodiments of the present application.

S350, which include implementing a human-personified virtual agent based on the video response, may function to generate and/or provide a response to user stimulus/user utterance by loading and/or playing a video response imprint via the human-personified virtual dialogue agent that best (most likely) responds to the user stimulus/user utterance, as shown by way of example in FIG. 7.

In one embodiment, S350 may function to identify and/or collect a target video response imprint together with an associated text-based transcript of the target video response imprint and load or transmit the video response imprint and transcript to a user system (client interface). Preferably, in such embodiments, the user system may include a display, such a computer or mobile device display panel, that includes a window or an interface object at which the video response imprint may be communicated and/or played.

In one implementation, S350 may function to generate a response via the human-personified virtual dialogue agent that includes executing the video response imprint together with the text-based transcript. In such embodiments, executing the text-based transcript may include superimposing on or overlapping the content of the text-based transcript with the video response imprint. In this way, a user may optionally follow the video response imprint based on viewing the text-based transcript of the video response imprint.

It shall be noted that, in some embodiments, S350 may only function to display the text-based transcript of the video response imprint if an accessibility setting of the human-personified virtual dialogue agent is toggled on. Conversely, in some embodiments, S350 may only function to display the video response imprint (and not the text-based transcript of the video response imprint) if the accessibility setting of the human-personified virtual dialogue agent is toggled off.

Additionally, or alternatively, in some embodiments, the identified imprint ID may be evaluated and/or matched against a proxy response item or a display response item which may be different from an original video response imprint (anchor answer) associated with the identified imprint ID. That is, in some embodiments, an original video response imprint may be tethered to or otherwise associated with a proxy response item that may be presented in lieu of the original video response imprint.

Additionally, or alternatively, in one or more implementations, S350 may function to play (via stream, download, and/or the like) any combinations of a video, audio, transcript, and/or the like of a video response imprint.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

Although omitted for conciseness, the preferred embodiments may include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A machine learning-based method of implementing a human video-personified virtual dialogue agent, the method comprising:
    computing an input embedding based on receiving a user input;
    computing, via a pre-trained machine learning language model, an embedding response inference based on the input embedding, the embedding response inference comprising a prediction of a likely response to the user input;
    performing a first search, based on the embedding response inference, of a response imprintation embedding space that includes a plurality of distinct embedding representations of distinct transcriptions of a plurality of distinct pre-recorded human-imprinted media responses to potential user inputs, wherein each of the plurality of distinct embedding representations of the response imprintation embedding space is tethered to one of the plurality of distinct pre-recorded human-imprinted media responses, wherein performing the first search includes:
        (i) defining an embedding search query using the prediction of the likely response to the user input associated with the embedding response inference,
        (ii) searching the response imprintation embedding space based on the embedding search query, and
    returning a target embedding representation from the response imprintation embedding space based on the searching of the response imprintation embedding space, wherein the target embedding representation is associated with a transcription of a distinct pre-recorded human-imprinted media response comprising a likely video response to the user input;
    retrieving the distinct pre-recorded human-imprinted media response based on the target embedding representation from the response imprintation embedding space; and
    executing, via a user interface, the distinct pre-recorded human-imprinted media response as a response to the user input.

2. The method of claim 1, wherein:
    searching the response imprintation embedding space includes:
        (1) computing a distance between the embedding response inference and one or more of the plurality of distinct embedding representations of the response imprintation embedding space, and
        (2) determining which embedding representation of the plurality of distinct embedding representations has a smallest distance to the embedding response inference, and
    the target embedding representation returned from the response imprintation embedding space corresponds to the embedding representation having the smallest distance to the embedding response inference.

3. The method of claim 1, wherein:
    searching the response imprintation embedding space includes:
        (1) computing a similarity metric between the embedding response inference and each of the plurality of distinct embedding representations, and
        (2) determining which embedding representation of the plurality of distinct embedding representation is most similar to the embedding response inference, and
    the target embedding representation returned from the response imprintation embedding space corresponds to the embedding representation most similar to the embedding response inference.

4. The method of claim 1, wherein the pre-trained machine learning language model computes the embedding response inference based on an embedding space different from the response imprintation embedding space, the method further comprising:
    normalizing the embedding response inference to the response imprintation embedding space contemporaneously with defining the embedding search query.

5. The method of claim 1, wherein the response imprintation embedding space relates to an n-dimensional vector space.

6. The method of claim 1, further comprising:
    contemporaneously with computing the embedding response inference via the pre-trained machine learning language model:
        computing, via one or more additional pre-trained machine learning language models, one or more additional embedding response inferences based on the input embedding,
    wherein:
        performing the first search of the response imprintation embedding space is based on the embedding response inference and the one or more additional embedding response inferences,
        performing the first search further includes:
            defining one or more additional embedding search queries based on the one or more additional embedding response inferences; and searching the response imprintation embedding space based on the one or more additional embedding search queries, and the target embedding representation returned from the response imprintation embedding space is based on searching the response imprintation embedding space with the embedding search query and the one or more additional embedding search queries.

7. The method of claim 6, wherein:

the one or more additional embedding response inferences include a first additional embedding response inference and a second additional embedding response inference, the one or more additional embedding search queries include a first embedding search query based on the first additional embedding response inference and a second embedding search query based on the second additional embedding response inference, searching the response imprintation embedding space based on the first additional embedding search query includes identifying, from the plurality of distinct embedding representations, an embedding representation most similar to the first additional embedding response inference, searching the response imprintation embedding space based on the second additional embedding search query includes identifying, from the plurality of distinct embedding representations, an embedding representation most similar to the second additional embedding response inference, and searching the response imprintation embedding space based on the embedding search query includes identifying, from the plurality of distinct embedding representations, an embedding representation most similar to the embedding response inference.

8. The method of claim 7, wherein:

searching the response imprintation embedding space further includes:
  identifying an embedding representation most frequently identified by the embedding search query and the one or more additional search queries; and
  determining which embedding representation of the plurality of distinct embedding representations is closest to the embedding representation most frequently identified by the embedding search query and the one or more additional search queries, and the target embedding representation returned from the response imprintation embedding space corresponds to the embedding representation determined to be closest to the embedding representation most frequently identified by the embedding search query and the one or more additional search queries.

9. The method of claim 8, wherein:

searching the response imprintation embedding space further includes:
  computing an average embedding representation based on embedding representations identified by the embedding search query and the one or more additional search queries; and
  determining which embedding representation of the plurality of distinct embedding representations is closest to the average embedding representation, and the target embedding representation returned from the response imprintation embedding space corresponds to the embedding representation determined to be closest to the average embedding representation.

10. The method of claim 1, wherein executing the distinct pre-recorded human-imprinted media response includes:
  playing the likely video response associated with the distinct pre-recorded human-imprinted media response at the user interface; and
  displaying, in association with the playing, a transcript of the distinct pre-recorded human-imprinted media response.

11. The method of claim 1, wherein:
  the user input is received via the user interface, and
  the user input comprises one or more of an utterance or textual input.

12. A method of implementing a human-personified virtual dialogue agent, the method comprising:
  computing an input embedding based on a user input;
  computing, via a pre-trained machine learning language model, an embedding response inference based on the input embedding, the embedding response inference comprising a prediction of a likely response to the user input;
  performing a first search, based on the embedding response inference, of a response imprintation embedding space that includes a plurality of distinct embedding representations of distinct transcriptions of a plurality of distinct pre-recorded human-imprinted media responses to potential user inputs, wherein each of the plurality of distinct embedding representations of the response imprintation embedding space is tethered to one of the plurality of distinct pre-recorded human-imprinted media responses, wherein the performing the first search includes:
    (i) defining an embedding search query using the prediction of the likely response to the user input associated with the embedding response inference, and
    (ii) executing the embedding search query to search the response imprintation embedding space, wherein the embedding search query returns a target embedding representation from the response imprintation embedding space, wherein the target embedding representation is associated with a transcription of a distinct pre-recorded human-imprinted media response comprising a likely video response to the user input; and
  executing, via a user interface, the distinct pre-recorded human-imprinted media response tethered to the target embedding representation as a response to the user input.

13. The method of claim 12, wherein the embedding search query returns the target embedding representation based on having an n-dimensional distance that is smallest relative to other embedding representations of the plurality of distinct embedding representations of the response imprintation embedding space.

14. The method of claim 12, wherein the response imprintation embedding space relates to a multi-dimensional vector space, the method further comprising:
  constructing the response imprintation embedding space, wherein constructing the response imprintation embedding space includes:
    identifying a human-imprinted media response corpus that includes a plurality of distinct human-imprinted media responses;
    generating, via a transcriber, a text-based transcription for each of the plurality of distinct human-imprinted media responses;

providing, as input to the pre-trained machine learning language model, the text-based transcription generated for each of the plurality of distinct human-imprinted media responses;

computing, by the pre-trained machine learning language model, an embedding representation for each of the plurality of distinct human-imprinted media responses based on the text-based transcription generated for each of the plurality of distinct human-imprinted media responses; and mapping the embedding representation computed for each of the plurality of distinct human-imprinted media responses to the multi-dimensional vector space.

15. The method of claim 14, wherein each of the plurality of distinct human-imprinted media responses of the human-imprinted media response corpus includes an audio/video (AV) component.

16. The method of claim 12, wherein:

the user input is received via the user interface, and executing the distinct pre-recorded human-imprinted media response tethered to the target embedding representation includes playing the distinct pre-recorded human-imprinted media response.

17. The method of claim 16, wherein:

in accordance with a determination that an accessibility setting of the human-personified virtual dialogue agent is toggled on:

forgoing playing the distinct pre-recorded human-imprinted media response; and displaying a text-based transcription of the distinct pre-recorded human-imprinted media response at the user interface.

\* \* \* \* \*